(12) United States Patent
Kletzli et al.

(10) Patent No.: US 6,520,682 B2
(45) Date of Patent: Feb. 18, 2003

(54) HIGH STRENGTH BALL END FOR A HITCH LINK

(75) Inventors: Daniel Benjamin Kletzli, Waterloo, IA (US); Shane Michael Boden, Waterloo, IA (US)

(73) Assignee: Deere & Company, Moline, IL (US)

( * ) Notice: Subject to any disclaimer, the term of this patent is extended or adjusted under 35 U.S.C. 154(b) by 16 days.

(21) Appl. No.: 09/851,826

(22) Filed: May 9, 2001

(65) Prior Publication Data

US 2002/0168122 A1 Nov. 14, 2002

(51) Int. Cl.⁷ .............................. F16C 7/00; F16C 23/04
(52) U.S. Cl. ...................... 384/210; 384/192; 384/208; 403/122; 403/131
(58) Field of Search ................................. 384/192, 206, 384/208, 209, 210, 211, 212; 403/122, 128, 131, 135

(56) References Cited

U.S. PATENT DOCUMENTS

| | | | |
|---|---|---|---|
| 3,160,449 A | * 12/1964 | Scott | 29/898.07 |
| 3,493,252 A | 2/1970 | Watson et al. | |
| 3,876,232 A | 4/1975 | Pertusi | |
| 4,174,137 A | * 11/1979 | Ferris | 29/898.07 |
| 4,248,486 A | * 2/1981 | Bradley, Jr. | 384/205 |
| 4,251,122 A | * 2/1981 | McCloskey | 29/898.043 |
| 4,466,631 A | 8/1984 | Berg | |
| 5,005,991 A | * 4/1991 | Heumann et al. | 384/208 |
| 5,524,987 A | * 6/1996 | Vigeh | 384/209 |

* cited by examiner

*Primary Examiner*—Thomas R. Hannon

(57) ABSTRACT

A bearing assembly for a hitch link having a removable spherical bushing within a socket is arranged to be symmetrical about a plane dissecting the socket lengthwise of the link. The socket is formed with laterally extending protrusion to increase the socket strength at the location of the greatest tension forces. The socket is configured with an entry slot for the bushing that is normal to the length of the link so that the slot does not interfere with the area of the contact wear surface between the busing and the socket. Once the bushing is installed in the socket, a sleeve is inserted into a bore of the bushing. One end of the sleeve has a raised retaining lip and the opposite end of the sleeve carries a snap ring groove. A snap ring is seated in the groove and retains the sleeve in the bushing.

8 Claims, 2 Drawing Sheets

HIGH STRENGTH BALL END FOR A HITCH LINK

FIELD OF THE INVENTION

The present invention relates to a hitch link for a three-point hitch and in particular to a hitch link having a high strength ball end.

BACKGROUND OF THE INVENTION

Many tractors, such as agricultural tractors, utility tractors and compact utility tractors, are equipped with a rear and/or front three-point hitch to connect implements to the tractor. Such hitches typically have two lower links, commonly referred to as draft links, and a single upper link. The outer ends of the links are equipped with a spherical bearing assembly having a pin hole that receives a pin to mount the implement to the link. The ends of the links are typically formed of a flat bar or a forged end of a bar to form the spherical bearing assembly. The dimensions of the bearing assembly are defined by industry standards such as standard S217.11 of the American Society of Agricultural Engineers. Through standardization, fit of the implement to the tractor hitch is assured.

The bearing assembly can be permanently assembled by placing a bushing having a spherical outer surface, into a spherical socket in the link member and then swaging the socket on one side to permanently retain the bushing within the socket. The swaging operation requires a flat surface on one side of the link member. The need for the flat surface prevents the socket from being locally thickened for added strength. Extensions or protrusions of the link member on the opposite side are known as a means to thicken the link member at the socket to increase the strength of the socket, but these are limited to a single side due to the requirements of the swaging operation.

To avoid the swaging operation, removable bearing assemblies are known in which an entry slot is provided in the spherical socket to enable the bushing to be inserted into the socket when properly aligned with the slot. The bushing is then rotated 90° to a use position in which the through bore in the bushing extends laterally of the link member. A retaining member such as a snap ring is inserted into a groove in the socket to prevent the bushing from being rotated back into alignment with the entry slot for removal. These types of removable bearing assemblies remove material from the socket to form the snap ring groove and many orient the entry slot such that material is removed from the spherical socket in the wear conduct area where the bushing engages the socket during use of the hitch.

SUMMARY OF THE INVENTION

The present invention provides a bearing assembly having a removable bushing enabling the width of the socket to be increased on both lateral sides to increase the section area. Further, no material is removed from the socket wear surface for a snap ring and the entry slot is oriented perpendicular to the length of the link member such that the wear conduct area in the longitudinal direction of the link member is not reduced by the entry slot. The result is a socket having symmetry about both lateral and horizontal planes which reduces bending loads and stresses in the link member.

The entry slot extends completely through the socket such that the bushing can be installed from either direction. This also allows the socket to be symmetrical. The bushing is installed by aligning the bushing with the entry slot, inserting the bushing into the socket and then rotating the bushing 90° so that the bore in the bushing is perpendicular to the length and extends laterally thereof. A sleeve is then inserted into the bore of the bushing. One end of the sleeve has a raised retaining lip and the opposite end of the sleeve carries a snap ring groove. A snap ring is seated in the groove and retains the sleeve in the bushing. With the sleeve in place, the bushing can no longer be removed from the socket even when the bushing is aligned with the entry slot. The bushing is thus retained in the socket without a snap ring groove in the socket that would reduce the wear contact area and strength of the socket.

DESCRIPTION OF THE PREFERRED EMBODIMENT

Figure 1:
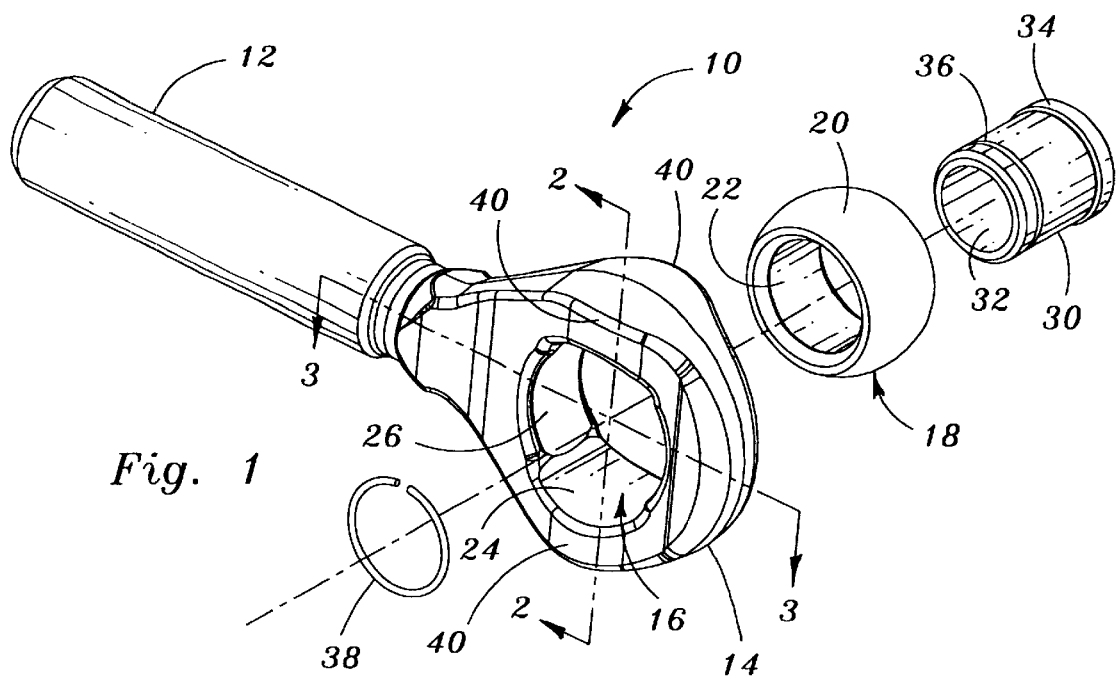
FIG. 1 is an exploded perspective view of the hitch link and bearing assembly of the present invention.

The hitch link and bearing assembly of the present invention is shown in FIG. 1 and designated generally at 10. The assembly 10 includes a hitch link member 12 having a ring shaped end portion 14 that defines a spherical socket 16. The spherical socket receives a bushing 18 having a spherical outer surface 20 and a through bore 22. The socket is formed with an entry slot 24 that extends vertically as shown in FIG. 1, normal to the length of the link member. The entry slot 24 extends completely through the spherical socket to enable the bushing 18 to be inserted into the socket from either lateral side of the link member. The through slot also results in symmetry of the socket about the longitudinal plane. The entry slot 24 interrupts the surface of the spherical socket such that the socket has a pair of spherical wear contact surfaces 26 and 28. By orienting the entry slot so that it extends in a direction that is normal to the longitudinal length of the link member 12, the wear contact surfaces 26, 28 are aligned with the length of the link member and the direction of the tension force in the link member.

Figure 4:
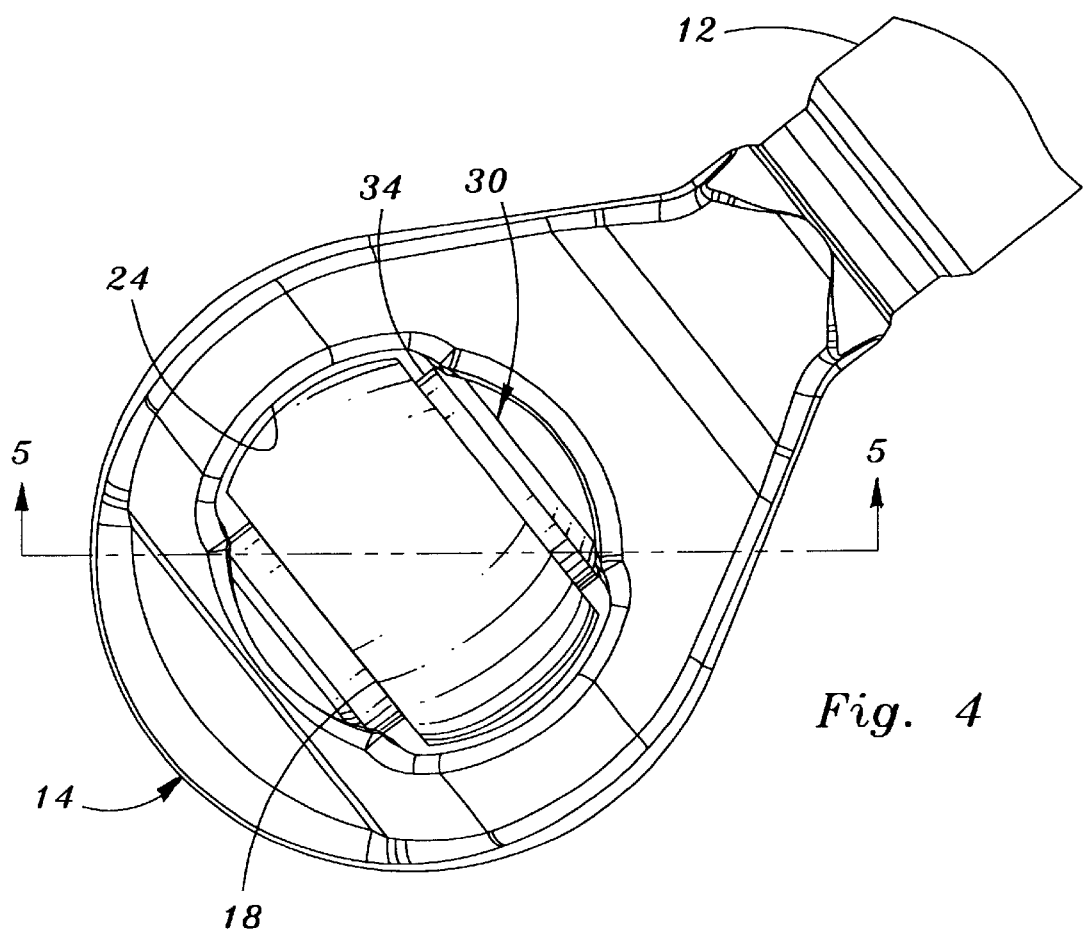
FIG. 4 is a side view of the hitch link and bearing assembly with the bushing installed and aligned with the entry slot.

The bushing 18 is installed in the socket by first aligning the bushing with the entry slot 24 as shown in FIG. 4. The bushing is then inserted into the entry slot and into the spherical socket 16. The bushing is then rotated in the socket 90° to the orientation of the bushing shown in FIG. 1 where the bore in the bushing extends laterally of the length of the link member. A cylindrical sleeve 30, having a through bore 32, is inserted into the bore 22 of the bushing 18. A raised retaining lip 34 at one end of the sleeve prevents the sleeve from passing through the bushing bore 22. At the opposite end of the sleeve, the outer surface is formed with a snap ring groove 36. A snap ring 38 is seated in the groove 36 and retains the sleeve in the bore 22.

Figure 5:
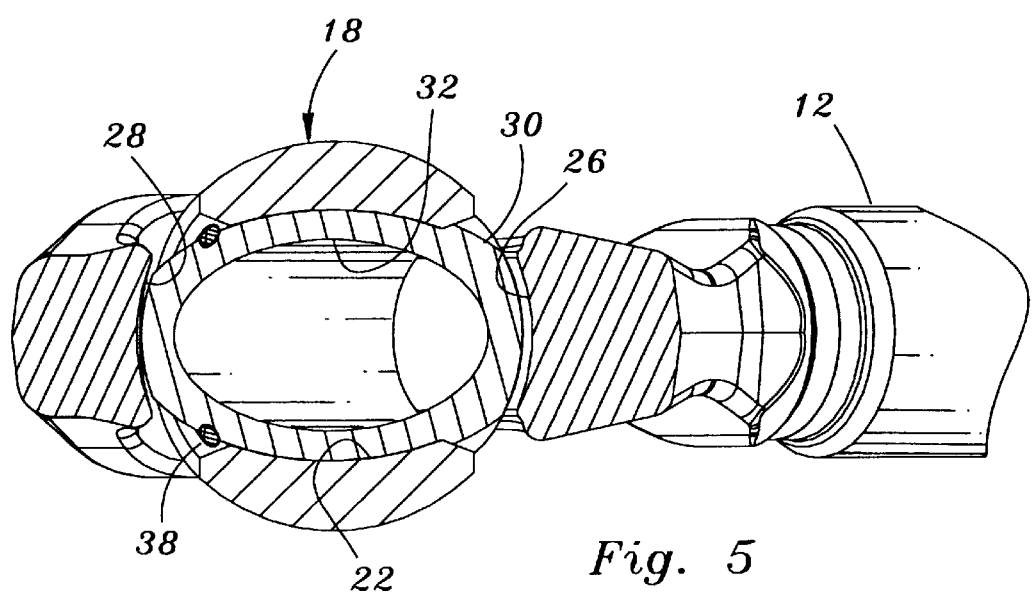
FIG. 5 is a sectional view of the bearing assembly a seen from substantially the line 5—5 of FIG. 4.

As shown in FIG. 4, the ends of the sleeve 30 extend outward beyond the bushing 18. If the bushing 18 is later aligned with the entry slot 24, the sleeve 30 is trapped within the envelope of the spherical socket as shown in the sectional view of FIG. 5. This prevents the bushing from being withdrawn from the spherical socket even though it is again aligned with the entry slot 24. Thus, until the sleeve 30 is removed, the bushing is trapped within the spherical socket 16.

Figure 2:
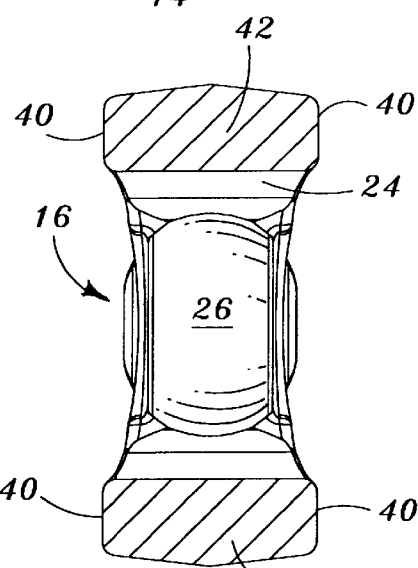
FIG. 2 is a sectional view of the spherical socket as seen from substantially the line 2—2 of FIG. 1.
Figure 3:
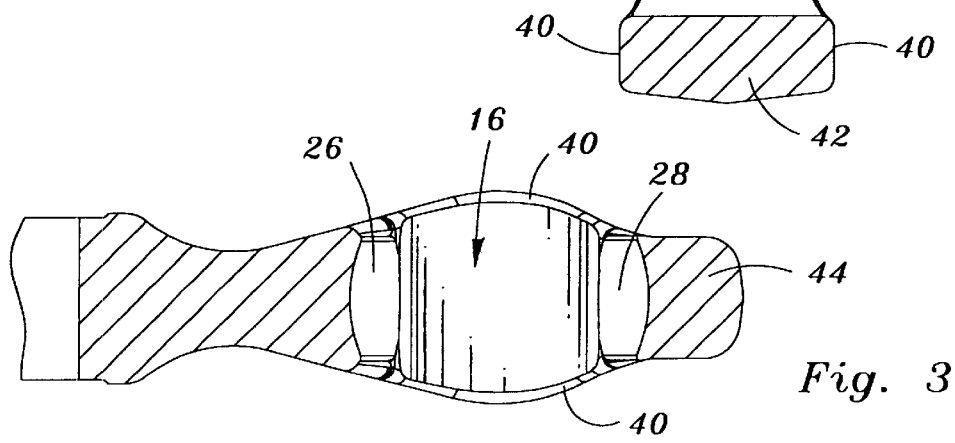
FIG. 3 is a sectional view of the spherical socket as seen from substantially the line 3—3 of FIG. 1.

The present invention enables the ring shaped portion 14 at the end of the link member to be formed with protrusions 40 on each lateral side. These protrusions 40 are located on the plane dissecting the socket perpendicular to the length of the link member. The cross sectional area 42 at the protrusions, as shown in FIG. 2, is larger than the cross sectional area 44 at the end of the link, on the plane dissecting the link member length wise thereof. By increasing the section 42, the strength of the ball joint is increased. By providing protrusions 40 on both sides, the section 42 is symmetrical to reduce bending loads and stresses in the link member. The protrusions 40 are made possible by eliminating a swaging operation to retain the bushing in the spherical socket.

Having described the preferred embodiment, it will become apparent that various modifications can be made without departing from the scope of the invention as defined in the accompanying claims.

What is claimed is:

1. A hitch link having a bearing assembly comprising:
   an elongated link member, the link member having one end defining a spherical socket having a spherical inner surface;
   a bushing positioned in the spherical socket having a spherical outer surface and a cylindrical bore therethrough;
   the spherical socket having an entry slot extending perpendicular to the length of the link member for receiving the bushing when the bushing is aligned with the entry slot;
   a sleeve positioned in the bore in the spherical bushing;
   means at the ends of the sleeve for retaining the sleeve in the bore with the ends of the sleeve extending beyond the bore; and
   wherein the ends of the sleeve, when the sleeve is installed in the bore, prevent removal of the bushing from the spherical socket when the bushing is aligned with the entry slot.

2. The hitch link as defined by claim 1 wherein the means for retaining the sleeve in the bore includes a shoulder at one end of the sleeve, a snap ring groove at the other end of the sleeve and a snap ring seated in the groove.

3. The hitch link as defined by claim 1 wherein the entry slot passes completely through the spherical socket whereby the bushing can be inserted into the spherical socket from either side.

4. The hitch link as defined by claim 1 wherein the link member end defining the spherical socket has an enlarged cross sectional area on a plane dissecting the socket perpendicular to the length of the link member as compared to the cross sectional area on a plane dissecting the link member lengthwise thereof.

5. A hitch link having a bearing assembly comprising:
   an elongated link member, the link member having one end defining a spherical socket having a spherical inner surface, the end of the link member having a ring shaped portion defining the spherical socket, the ring shaped portion having an enlarged cross sectional area on a plane dissecting the socket perpendicular to the length of the link member as compared to the cross sectional area on a plane dissecting the link member lengthwise thereof with the enlarged cross sectional area formed by projections on opposite lateral sides of the ring shaped portion;
   a bushing positioned in the spherical socket having a spherical outer surface and a cylindrical bore therethrough;
   the spherical socket having an entry slot extending perpendicular to the length of the link member for receiving the bushing when the bushing is aligned with the entry slot;
   a sleeve positioned in the bore in the spherical bushing;
   means at the ends of the sleeve for retaining the sleeve in the bore with the ends of the sleeve extending beyond the bore; and
   wherein the ends of the sleeve, when the sleeve is installed in the bore, prevent removal of the bushing from the spherical socket when the bushing is aligned with the entry slot.

6. The hitch link having a bearing assembly as defined by claim 5 wherein the ring shaped member is symmetrical about the plane dissecting the link member lengthwise thereof.

7. A hitch link having a bearing assembly comprising:
   an elongated link member, the link member having one end defining a spherical socket having a spherical inner surface;
   a bushing positioned in the spherical socket having a spherical outer surface and a cylindrical bore therethrough;
   a sleeve positioned in the bore in the spherical bushing; and
   means at the ends of the sleeve for retaining the sleeve in the bore with the ends of the sleeve extending beyond the bore.

8. The hitch link as defined by claim 7 wherein the means for retaining the sleeve in the bore includes a shoulder at one end of the sleeve, a snap ring groove at the other end of the sleeve and a snap ring seated in the groove.

* * * * *